Patented Jan. 16, 1923.

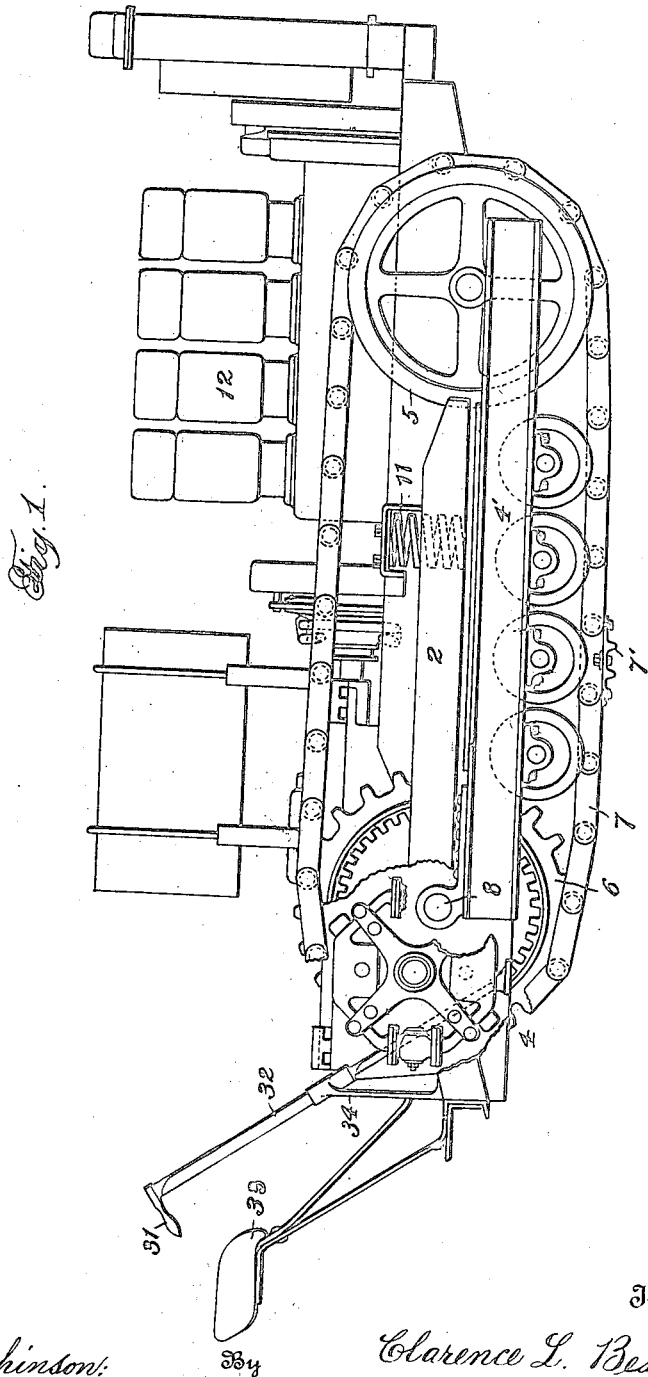

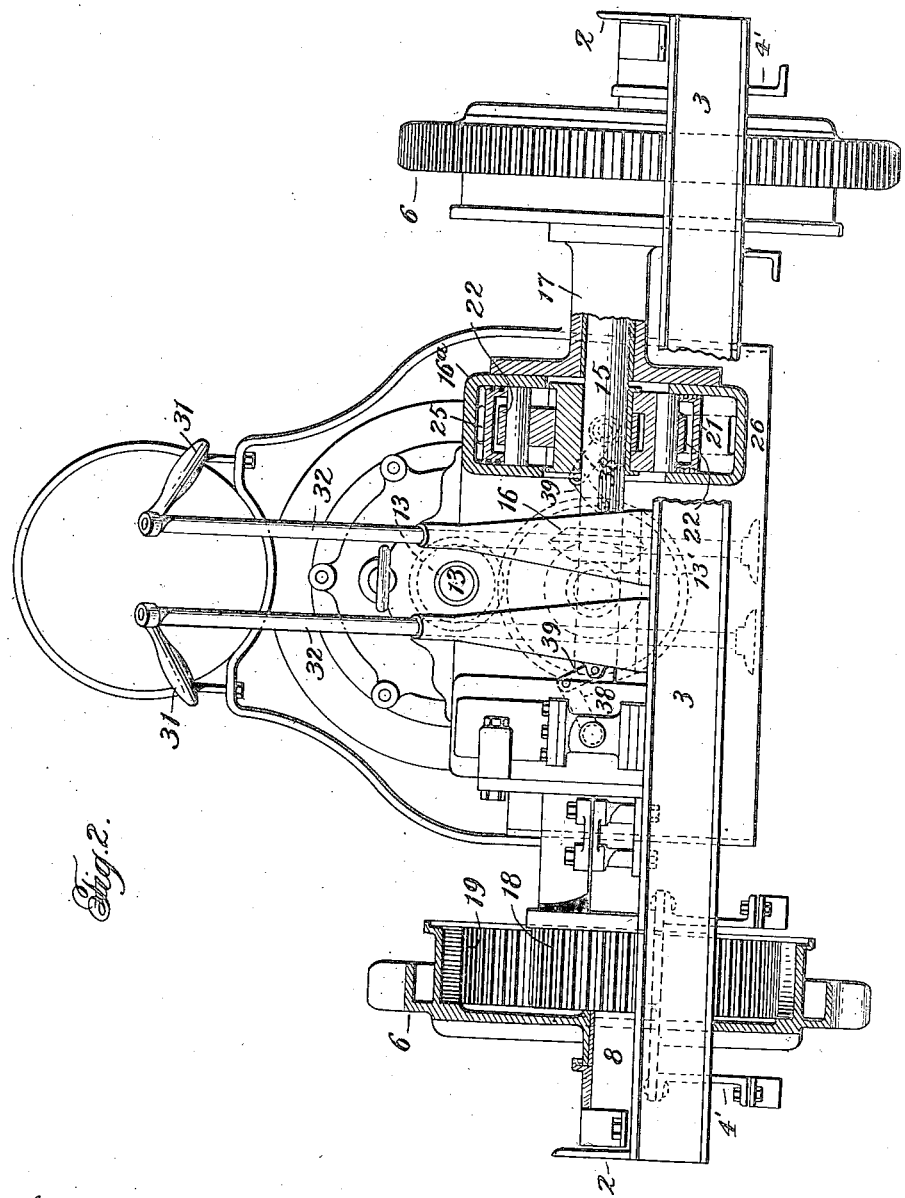

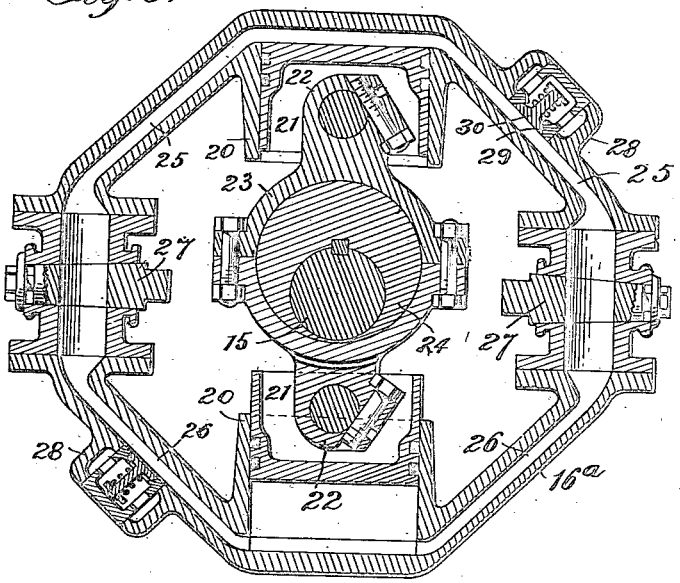
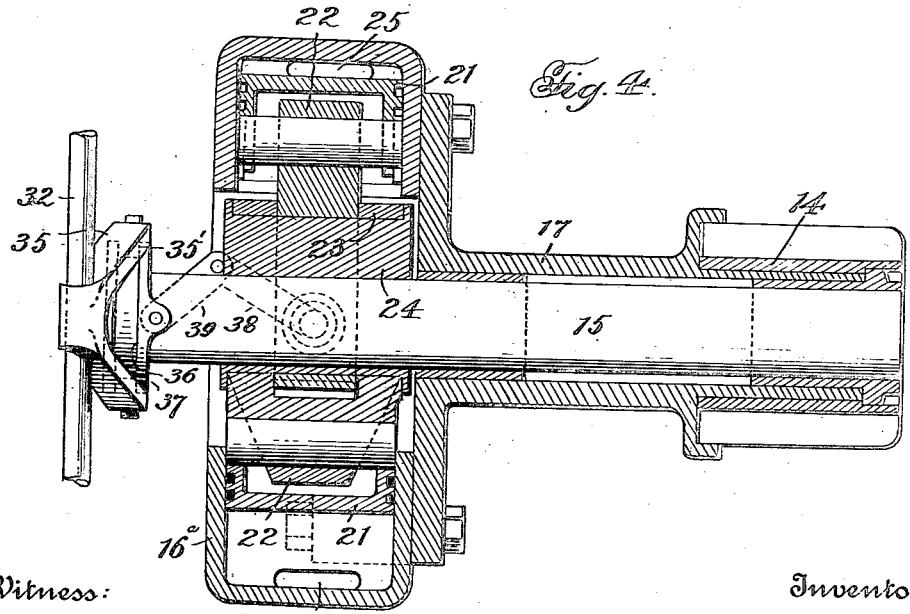

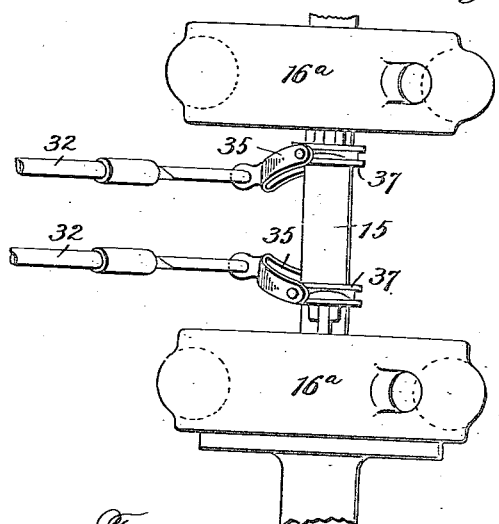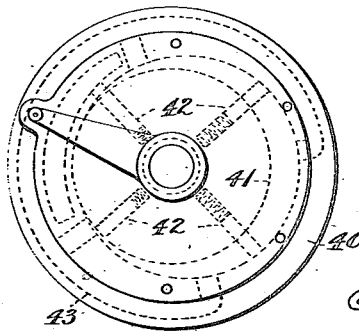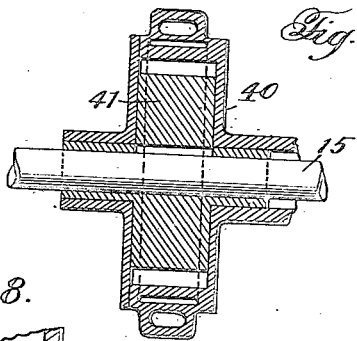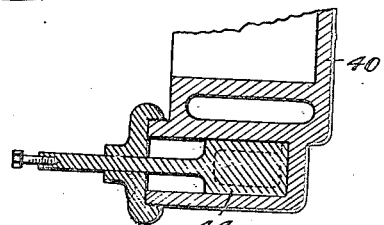

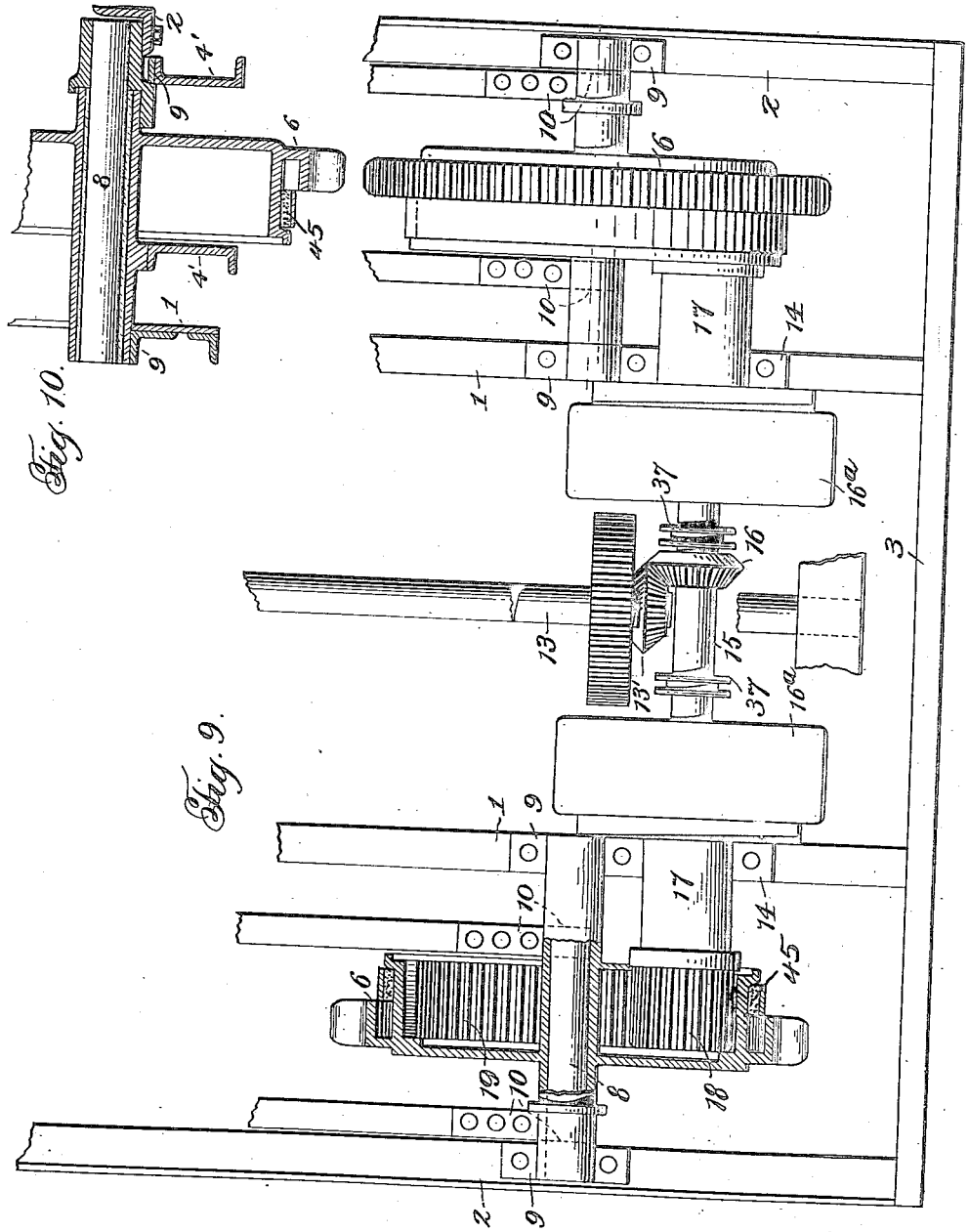

1,442,555

UNITED STATES PATENT OFFICE.

CLARENCE LEO BEST, OF SAN LEANDRO, CALIFORNIA, ASSIGNOR TO THE HOLT MANU-FACTURING COMPANY, OF STOCKTON, CALIFORNIA, A CORPORATION OF CALIFORNIA.

STEERING DEVICE FOR TRACK-LAYING TRACTORS.

Application filed October 17, 1918. Serial No. 258,601.

*To all whom it may concern:*

Be it known that I, CLARENCE LEO BEST, a citizen of the United States, residing at San Leandro, in the county of Alameda and State of California, have invented certain new and useful Improvements in Steering Devices for Track-Laying Tractors, of which the following is a specification, reference being had therein to the accompanying drawing.

This invention relates to improvements in track laying tractors and more particularly to an improved steering device for such machines.

It has heretofore been proposed in the wheeled type of tractor to employ friction clutches for steering purposes, the clutches being associated with opposite drive wheels and operated to release one drive wheel or the other to turn the machine. With the introduction of the caterpillar type of tractor attempts have been made to employ similar friction clutches as steering means, but this has been found to have many serious defects and disadvantages owing to the widely different conditions presented by this class of machines namely, the extended traction area in contact with the ground, this ordinarily making them clumsy or difficult to guide. It is desired, in order to make slight turns, that the clutch only be released a little or permitted to slip. This heats up and wears out the friction clutch so that frequent adjustments are necessary and relining of the clutch eventually required. In plowing, cultivating or road work owing to the difference in ground contour it is necessary to work the clutches quite frequently to maintain the machine pointed in the desired direction. With a friction clutch the steering operation is jerky and hard on the entire mechanism, and the amount of slip is difficult of regulation being dependent solely upon the skill of the operator. Furthermore, in working such friction clutches there are large levers which are hard to handle, considerable strength being required in their manipulation, which is a serious objection especially under present economic or social conditions necessitating the carrying on of this work largely by women or boys.

The present invention has for its object to provide an improved steering device for track laying tractors by which the difficulties hereinbefore referred to will be entirely overcome, to provide an improved steering device for track laying tractors that will have a smooth, easy operation, that will be free from metallic friction wearing surfaces, one by which a relative variation in motion of the driven endless track elements can be effected to a nicety over a wide range without shock or sudden strains to the parts, that can be operated with little effort and capable of being readily controlled by unskilled labor.

It is the object of this invention to utilize the inherent characteristics of ordinary liquid fluids; to utilize their characteristic fluidity as a means of gradual control and their incompressibility as a means for forming a functional connection between the motor power means and the driven element of the track layer members. I desire to take advantage of the qualities of fluidity and incompressibility inherent in fluids and in no other condition of matter whereby these peculiar characteristics may serve a useful purpose in the economy of steering tractors each quality utilized in accordance with its natural aptitude. In other words I use a functioning fluid, the fluidity of which permits of gradual control, and the incompressibility of which permits and effects the connection of motor and driven parts substantially as would be done by a rigid incompressible element.

Thus the invention hereinafter described does not reside in the peculiar form of mechanism which I employ, this being shown as illustrating one simple and practical construction whereby my invention may be practiced.

The invention, with other objects and advantages thereof and the particular combination and arrangement of parts comprising the same will be understood from the hereinafter contained detail description when considered in connection with the accompanying drawings forming part hereof and illustrating one embodiment of the invention.

In the drawings:

Figure 1 is a side elevation of a track laying tractor equipped with a steering device in accordance with the present invention.

Fig. 2 is an end elevation with certain of the parts shown in transverse section.

Fig. 3 is a detail vertical section of the fluid connecting means.

Fig. 4 is a detail transverse section of the fluid connecting means.

Fig. 5 is a top plan of the controlling cranks and their connection with the fluid connecting means.

Fig. 6 is a detail side elevation of a modified form of fluid connection.

Fig. 7 is a transverse section of the construction illustrated in Figure 6.

Fig. 8 is a detail section of one of the controlling valves in the modified construction illustrated in Figs. 6 and 7.

Fig. 9 shows a plan view, partly in section, of the rear portion of a tractor frame to which my invention is applied.

Fig. 10 shows a sectional view of a part of the tractor frame, illustrating one of the sprocket driving wheels for the track.

The invention is shown in the drawings applied to one of the well known small types of track laying tractors having a main frame comprising intermediate longitudinally extending beams 1, and at each side and spaced therefrom outer longitudinal beams 2, the beams 1 being suitably braced and secured to each other, and the beams 2 rigidly secured together and to the beams 1 at the rear by a transverse beam 3. The main frame is supported upon endless track layer tracks 4 located at opposite sides thereof between the intermediate longitudinal beam 1, and the outer longitudinal beams 2, said endless track layer tracks being pivotally connected at their rear ends to the main frame for independent yielding oscillatory movement in vertical planes to automatically accommodate themselves to uneven ground surface. Each endless track layer track 4 consists of a frame 4' with an idler wheel 5 at its front end and a driving sprocket 6 at the rear. 7 is the endless traction chain in engagement with the idler wheel 5 and driving sprocket 6, and provided with tread plates 7'. The pivotal connection of each endless track with the main frame is provided by a short shaft 8 supported in bearings 9—9 on longitudinal beams 1—2, and engaging spaced bearings 10 on the rear end of the endless track frame 4', these short pivot shafts 8 also serving as journals for the driving sprockets 6. Between the main frame and the endless tracks 4 are provided yielding spring members 11. Suitably mounted forward of the main frame is the motor 12, and 13 is the power shaft.

In accordance with the present invention a fluid connection is provided between the power shaft 13 and each one of the endless track layer tracks 4, the fluid connection including a container for a substantially incompressible fluid in functional flow, a member movable within the container, one of said parts being connected with one of the driven elements of the track and the other to the driving source of power, and means for controlling the functional flow whereby a variable motion of the two endless tracks is effected. Manifestly many different kinds of fluid connection may be employed. The particular form of fluid connection, illustrated in the drawings, by way of example, is the same for both endless tracks 4. Supported for rotation in bearings 14—14 on the main frame is a transversely extending shaft 15 driven from the power shaft 13 through a pinion 13' on the power shaft meshing with a pinion 16 keyed on the shaft 14. Each fluid connection comprises a driven member in the form of a wheel 16^A having a laterally extending hub or sleeve 17 mounted loosely upon the shaft 15. At one end the sleeve 17 is provided with a gear 18, which meshes with an internal gear 19 on one of the driving sprockets 6 of one of the endless tracks 4. Fixedly mounted upon the driven wheel member 16^A at diametrically opposite points are cylinders 20—20. Arranged to work in the cylinders are pistons 21—21 that are pivotally connected to the outer ends of arms 22—22 rigid with an eccentric strap 23 in engagement with an eccentric 24, the latter being keyed to the driven shaft 15, and the arrangement being such that upon rotation of the shaft 15 and eccentric 24, the pistons 21—21 will be operated together in opposite directions. The cylinders are connected at one end by fluid conducting passages or channels 25—26 and interposed in said passages are rotary valves 27—27, the passages and valves being mounted upon the driven wheel member 16^A for rotation therewith, and said valves being adapted to be adjusted to completely close the passages 25—26; or to permit free flow of liquid therethrough; or to more or less partially restrict the flow.

The cylinders 20—20 and passages 25—26 constitute the container for the functioning fluid, the system being filled with a substantially non-compressible fluid as for instance oil. With the valves 27 in open position permitting free circulation of the liquid, as indicated in Figure 3 of the drawings, upon rotation of the shaft 15 and eccentric 24, the pistons 21—21 moving together in opposite directions will force the oil through the passages 25—26 alternately from one cylinder to the other, practically no resistance being offered by the liquid to the movement of the pistons, and no movement being transmitted to the driven member 16^A. If the valves 27 are closed entirely cutting off the circulation of the liquid, the liquid will then function to lock the driven member 16^A to the eccentric 24 for rotation therewith at equal speed. By partially opening the valves 27 and permitting a restricted flow of the liquid, the member 16^A will be driven at a reduced speed. Upon the movement of the valves 27 from closed toward full open position, the speed of rotation of the driven member 16^A is gradually lessened, the speed of rotation of the driven member depending upon the position of the valves 27 and the extent of restriction of the circulation of the fluid.

In order to compensate for leakage of fluid from the system, small reservoirs or pockets 28 for an extra supply of fluid are provided. 29 designates outlets from the pockets into the passages 25—26. These outlets 29 are controlled by valves 30 which open automatically to permit additional fluid to be supplied to the system from the pockets 28 when the supply of fluid in the system becomes reduced.

31—31 designates small hand levers for adjusting the valves 27 of the respective fluid connections. The hand levers 31—31 are fixed to the upper ends of vertical crank shafts 32 within reach of the operator's seat 33, the crank shafts 32 being mounted for rotation in bearings 34 on the main frame. Rigidly secured to the lower ends of the crank shafts 32 are yokes 35 provided with pins 35' in engagement with annular grooves 36 in sleeves 37 loosely mounted upon the driven shaft 15. The valves 27 are provided with cranks 38, which are connected with the sleeves 37 by links 39 so that upon movement of the sleeves 37 laterally, through the hand levers 31 and crank shafts 32, the valves 27 will be turned.

In Figures 6, 7 and 8 of the drawings, is illustrated a modified form of fluid connection. 40 designates the container for the functioning fluid. In this modified construction the member 41 movable within the container takes the form of a rotary piston or rotor having wings or abutments 42. 43 designates by-pass channels of the container, and 44 valves for governing the circulation of the fluid.

A brake is provided for the driven member 16^A of each of the fluid connections for the purpose of holding the driven member of the fluid connection against movement in making short turns. Any suitable form of brake may be employed. The construction shown comprises a brake band 45 on each internal gear 19.

It will be noted that the fluid connections between the power shaft 13 and the respective tracks provides for the regulation to a fine degree and over a wide range of the relative variation of the speed at which the endless tracks are driven, and thus affords great flexibility of control and a highly efficient steering means. The variation in speed is effected in a gradual manner, through the fluid in functional flow, without jar or sudden strains to the mechanism, and metallic friction wearing surfaces are entirely dispensed with.

What I claim is:

1. In a steering device for vehicles, the combination with a pair of traction devices, and a motor and power shaft for driving them, of a fluid connection between the driving and one of the driven elements, the fluid connection including a container for a substantially incompressible fluid in functional flow, oppositely moving pistons within the container, operating means for said pistons, said container being connected with one of the driven elements of the traction device and the operating means for the pistons being connected to the driving source of power, and means for controlling the functional flow whereby a variable relative motion of the two traction devices is effected.

2. In a steering device for track laying tractors, the combination with a pair of endless track layer tracks, and a motor and power shaft for driving them, of a fluid connection between the driving and one of the driven elements, the fluid connection including a container for a substantially incompressible fluid in functional flow, a member movable within the container, one of said parts being connected with one of the driven elements of the track and the other to the driving source of power, and means for controlling the functional flow whereby a variable relative motion of the two endless tracks is effected, and a brake for each of the endless track layer tracks.

3. In a steering device for track laying tractors, the combination with a pair of endless track layer tracks, and a motor and power shaft for driving them, of a fluid connection between the power shaft and each one of the endless track layer tracks, the fluid connection including a container for a substantially incompressible fluid in functional flow, a member movable within the container, one of said parts being connected with the driving source of power and the other to one of the driven elements of the track, and independently operated valve mechanism for each fluid clutch for controlling the functional flow whereby a variable motion of the two endless tracks is effected separately.

4. In a steering device for track laying tractors, the combination with a pair of endless track layer tracks, and a motor and power shaft for driving them, of a fluid connection between the power shaft and each one of the endless track layer tracks, the fluid connection including a container for a substantially incompressible fluid in functional flow, a member movable within the container, one of said parts being connected with the driving source of power and the other to one of the driven elements of the track, and independent means for each fluid clutch for controlling the functional flow whereby a variable motion of the two endless tracks is effected, and a friction brake for each of the endless track layer tracks.

In testimony whereof I hereunto affix my signature in the presence of two witnesses.

CLARENCE LEO BEST.

Witnesses:
H. C. MONTGOMERY,
J. P. BUCK.